(12) United States Patent
Kim et al.

(10) Patent No.: US 9,378,763 B1
(45) Date of Patent: Jun. 28, 2016

(54) TRACK OFFSET COMPENSATION IN SHINGLED RECORDING

(71) Applicant: Seagate Technology LLC, Cupertino, CA (US)

(72) Inventors: Hwajun Kim, Hwaseong-si (KR); Hojoong Choi, Yongin (KR); Seong Yong Yoon, Scongdong-gu (KR)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/026,724

(22) Filed: Sep. 13, 2013

(51) Int. Cl.
| | |
|---|---|
| *G11B 27/36* | (2006.01) |
| *G11B 5/56* | (2006.01) |
| *G11B 5/02* | (2006.01) |
| *G11B 5/58* | (2006.01) |
| *G11B 5/012* | (2006.01) |
| *G11B 5/54* | (2006.01) |
| *G11B 5/596* | (2006.01) |

(52) U.S. Cl.
CPC *G11B 5/56* (2013.01); *G11B 5/012* (2013.01); *G11B 5/02* (2013.01); *G11B 5/54* (2013.01); *G11B 5/58* (2013.01); *G11B 5/596* (2013.01); *G11B 27/36* (2013.01)

(58) Field of Classification Search
None
See application file for complete search history.

(56) References Cited

U.S. PATENT DOCUMENTS

| | | | |
|---|---|---|---|
| 6,185,063 B1* | 2/2001 | Cameron | 360/78.04 |
| 7,027,255 B2 | 4/2006 | Schmidt | |
| 8,462,468 B2 | 6/2013 | Katada | |
| 8,824,083 B1* | 9/2014 | Kientz et al. | 360/55 |
| 2007/0030588 A1* | 2/2007 | Tsuchinaga et al. | 360/77.08 |
| 2012/0303884 A1 | 11/2012 | Hall | |
| 2013/0028058 A1 | 1/2013 | Yasui | |
| 2013/0170061 A1 | 7/2013 | Saito | |
| 2013/0335856 A1* | 12/2013 | Tanabe et al. | 360/76 |
| 2014/0029133 A1* | 1/2014 | Tagami et al. | 360/75 |

* cited by examiner

*Primary Examiner* — Andrew L Sniezek
(74) *Attorney, Agent, or Firm* — Cesari & Reed, LLP; Kirk A. Cesari; Christian W. Best (57) ABSTRACT

Systems and methods are disclosed for positioning of a reader element in a data storage device employing shingled recording. In an embodiment, an apparatus may comprise a processor configured to receive a read command to retrieve data from a data storage medium having data stored in a shingled manner where at least one track is partially overlapped by an adjacent track, and retrieve the data by adjusting a position of a read element according to a track offset compensation value based on a measured parameter. In another embodiment, a method may comprise determining a track offset compensation value for a first area of a data storage medium based on a measured parameter for the area, adjusting a position of a read head based on the track offset compensation value, and reading data from the first area using the read head.

16 Claims, 10 Drawing Sheets

TRACK OFFSET COMPENSATION IN SHINGLED RECORDING

BACKGROUND

The present disclosure relates to data storage mediums, and provides systems and method for improving data storage device performance, especially when using shingled magnetic recording.

SUMMARY

In one embodiment, an apparatus may comprise a processor configured to receive a read command to retrieve data from a data storage medium having data stored in a shingled manner where at least one track is partially overlapped by an adjacent track, and retrieve the data by adjusting a position of a read element according to a track offset compensation value based on a measured parameter.

In another embodiment, a method may comprise determining a track offset compensation value for a first area of a data storage medium based on a measured parameter for the area, adjusting a position of a read head based on the track offset compensation value, and reading data from the first area using the read head.

In yet another embodiment, a data memory device may contain computer-readable instructions that, when executed by a processor, perform a method comprising receiving a read command at a data storage device including a data storage medium, determining a track offset compensation value for a first area of the data storage medium based on a measured parameter for the first area, shifting, according to the track offset compensation value, a read track center for data tracks of the first area, and reading data from the first area using the read head.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Figure 1:
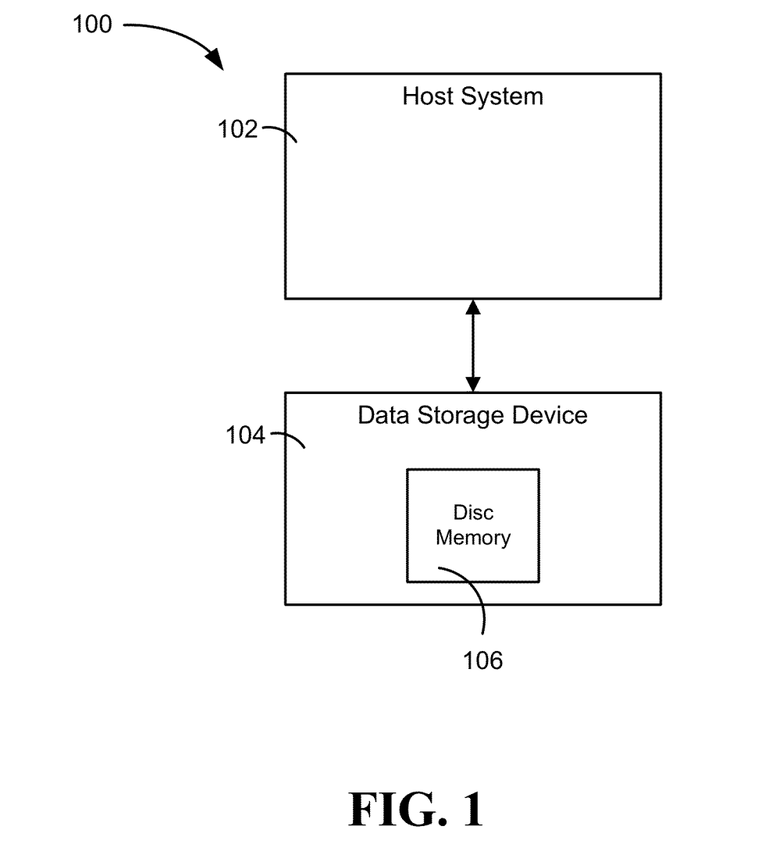
FIG. 1 is a diagram of an illustrative embodiment of a system for track offset compensation in shingled recording.

FIG. 1 depicts an embodiment of a system for track offset compensation in shingled recording, generally designated 100. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, an internal or external hard drive, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102, or the host 102 and DSD 104 may both be part of a single unit.

The DSD 104 can include one or more nonvolatile memories 106. In the depicted embodiment, the DSD 104 may be a hard disc drive (HDD) including a rotating disc memory 106. In other embodiments, the DSD 104 may contain additional memories or memory types, including volatile and nonvolatile memories. For example, DSD 104 could be a hybrid HDD with both a disc memory and a nonvolatile solid state memory.

In some embodiments, DSD 104 may have one or more discs 106 having tracks for storing data. A disc 106 may be divided into multiple zones, each with a plurality of tracks. Each track can be further divided into a plurality of physical sectors for storing data. Chunks of data with accompanying logical block addresses (LBAs) can be stored to the sectors, with the LBAs being mapped to the sector holding the respective chunk of data. Each zone may have different configurations of various options, such as data track format, direction of writing from a transducer, data density, or intended uses. For example, the disc may have one or more zones designated for data storage in a shingled track manner using shingled magnetic recording (SMR), and one or more zones for storing data in a non-shingled manner. SMR is a recording method used to increase data recording density on a disc, for example by writing a track of data to partially overlap an adjacent data track. SMR will be discussed in more detail with regard to FIGS. 3-4. The disc may also have a zone designated as a 2nd level cache using disk storage intended for non-volatile caching of data. The disc may further have at least one zone designated for spare sectors.

Figure 2:
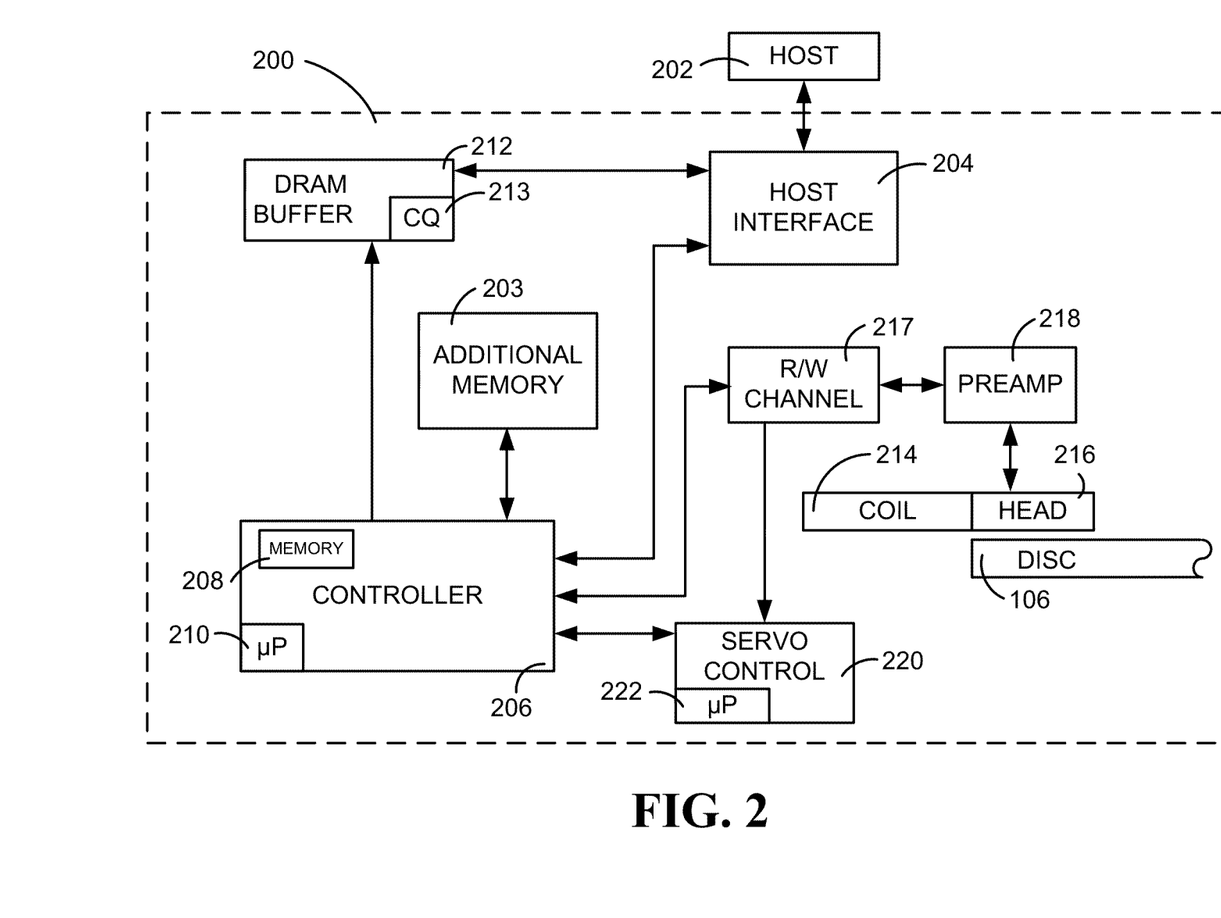
FIG. 2 is a diagram of another illustrative embodiment of a system for track offset compensation in shingled recording.

FIG. 2 depicts a diagram of an embodiment of a system for track offset compensation in shingled recording, generally designated 200. Specifically, FIG. 2 provides a functional block diagram of an example disc drive data storage device (DSD) 200. The DSD 200 may be a data storage device such as the disc drive 104 shown in FIG. 1. More generally, the DSD 200 can be a removable storage device, a desktop computer, a laptop computer, a server, a tablet computer, a telephone, a music player, another electronic device, any other device which may be used to store or retrieve data, or any combination thereof.

The data storage device 200 can communicate with a host device 202 via a hardware or firmware-based interface circuit 204 that may include a connector (not shown) that allows the DSD 200 to be physically removed from the host 202. The host 202 may also be referred to as the host system or host computer. The host 202 can be a desktop computer, a laptop computer, a server, a tablet computer, a telephone, a music player, another electronic device, or any combination thereof.

In some embodiments, the DSD 200 may communicate with the host 202 through the interface 204 over wired or wireless communication, or by a local area network (LAN) or wide area network (WAN). In some embodiments, the DSD 200 can be a stand-alone device not connected to a host 202, or the host 202 and DSD 200 may both be part of a single unit.

The buffer 212 can temporarily store data during read and write operations, and can include a command queue (CQ) 213 where multiple pending operations can be temporarily stored pending execution. In some examples, the buffer 212 can be used to cache data. The DSD 200 can include an additional memory 203, which can be either volatile memory such as DRAM or SRAM, or non-volatile memory, such as NAND Flash memory. The additional memory 203 can function as a cache and store recently or frequently read or written data, or data likely to be read soon. A DSD 200 containing multiple types of nonvolatile storage mediums, such as a disc 106 and Flash 203, may be referred to as a hybrid storage device. The disc 106 may be configured to store data in a shingled manner.

The DSD 200 can include a programmable controller 206 with associated memory 208 and processor 210. Further, FIG. 2 shows the DSD 200 can include a read-write (R/W) channel 217, which can encode data during write operations and reconstruct user data retrieved from disc(s) 106 during read operations. A preamplifier circuit (preamp) 218 can apply write currents to the head(s) 216 and provides pre-amplification of read-back signals. The head(s) 216 can also be referred to as a transducer, which may be a component including a write element, a read element, or both. A servo control circuit 220, which can include a processor 222, may use servo data to provide the appropriate current to the coil 214 to position the head(s) 216. The controller 206 can communicate with the servo control circuit 220 to move the head(s) 216 to the desired locations on the disc(s) 106 during execution of various pending commands in the command queue 213.

As discussed above, SMR is a recording method used to increase data recording density on a disc, which can be accomplished by decreasing track width below a width written by a writer element of a transducer head. This can be accomplished by partially overwriting a data track with an adjacent data track, resulting in a "shingled" track structure. For example, SMR write operations can be performed by sequencing writes so that they progress in one radial direction (i.e. tracks may be written one at a time moving from the inner diameter towards the outer diameter, or vice-versa), where tracks partially overlap each other similar to roofing shingles. Partially overwriting a track with another track may also be referred to as "trimming." A single write direction may be used across an entire disc, but can also be selected based on zones or sets of tracks, with a direction set for each zone or set of tracks.

Figure 3A:
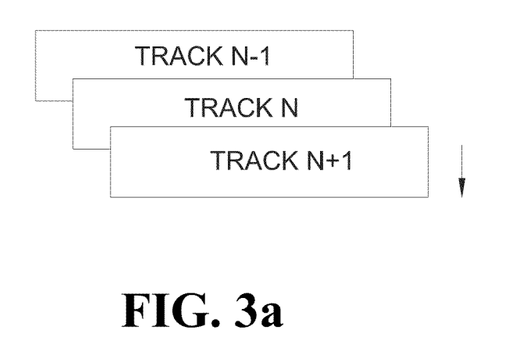
FIGS. 3a and 3b are diagrams of another illustrative embodiment of a system for track offset compensation in shingled recording.

Referring to FIG. 3a, if it is assumed that writing is performed in the arrow-indicated direction in the shingle-write scheme, when writing to track N, adjacent track N−1 may be partially overwritten. Similarly, when writing is performed on track N+1, adjacent track N may be partially overwritten. In contrast to recording methods where each track is written without any intentional overlap, SMR may result in increased recording density due to a higher tracks per inch (TPI) characteristic in a radial direction of a storage medium.

Figure 3B:
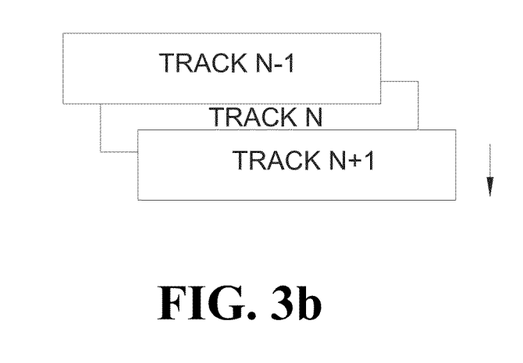

As illustrated in FIG. 3b, after writing on track N, if track N−1 is written in a reverse direction of the shingled recording direction, track N may become unreadable due to Adjacent Track Interference (ATI), or being partially overwritten by both adjacent tracks. Therefore, it may be advantageous to follow a constraint that track N−1 should not be written after track N is written. Accordingly, writing or modifying data on track N−1 after track N is recorded, or on track N after track N+1 is recorded, may require a different writing strategy than with non-shingled tracks, which can simply be overwritten at any time.

Figure 4:
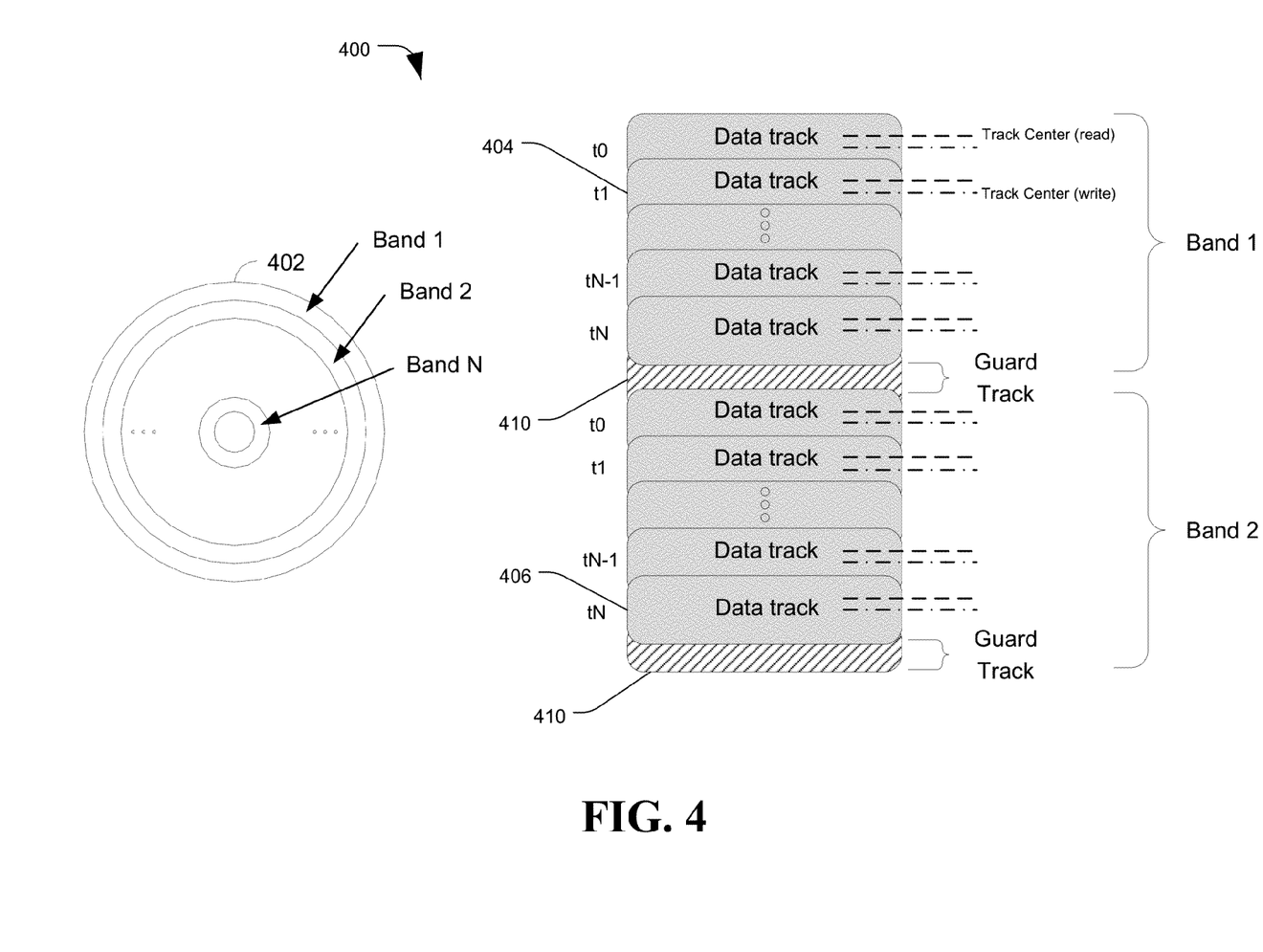
FIG. 4 is a diagram of another illustrative embodiment of a system for track offset compensation in shingled recording.

Turning now to FIG. 4, a diagram of another illustrative embodiment of a system 400 for track offset compensation in shingled recording is depicted. Due to the track write overlap of SMR, writing a given track N−1 after track N has been written may require rewriting all shingled tracks that following track N−1 (i.e. track N, track N+1, track N+2, etc.). In order to accomplish this realistically, a set of tracks may be grouped into a "band," such that writing the last track of the band X does not require rewriting any of the following tracks X+1, X+2, X+3 and so on. Rotating disc media 402 may be divided into a plurality of bands (e.g. Band 1, Band 2, etc.), and each band may contain a plurality of shingled data tracks.

Separating bands so that rewriting one does not require rewriting tracks outside the band can be accomplished by locating the tracks such that the last track of a band is not trimmed or overlapped by a track that can be written. This in turn can be accomplished in a number of ways, such as formatting bands so that the last track of each band is not overlapped by an adjacent track. However, this may require two or more different track pitches for bands, with a first for shingled tracks and a second pitch for end-of-band tracks that are not to be partially overwritten.

Alternatively, one or more tracks following each end-of-band track can be designated as not to be written. Bands may have a number of shingled tracks 404, such as tracks t0 through tN−1 of FIG. 4, which are partially overlapped by adjacent tracks and have a reduced read track pitch relative to the write track pitch. Bands may also end with an unshingled track 406, such as track tN of FIG. 4, which does not have a reduced read track pitch relative to its write track pitch. Because the last track 406 is not overlapped by a writable track, the band can be rewritten without affecting tracks outside the band. The last track 406 of each band may be followed by a "not-to-be-written" track, preventing the last track from being partially overwritten. Not-to-be-written tracks may be referred to as "guard tracks" 410, as they provide band boundaries to separate writable tracks of different bands and guard the last track 406 of a band from being trimmed by or trimming tracks outside the band. When track N−1 needs to be re-written, tracks N−1 to the Guard Track can be rewritten, while tracks in other bands are not affected. In some embodiments, a single guard track may be used, while in some embodiments multiple tracks may be designated as "not to be written" between bands to provide a larger buffer against ATI. A guard track may also be referred to as a guard band or isolation track.

In some embodiments, the guard track between bands can be a full non-shingled track (i.e. a track not trimmed by either adjacent track), but this may again require different track pitches and consequently require determining band boundaries prior to defining the tracks on the disc. In other embodiments, a guard track may be a shingled track which is not used to store data. In other words, all writable tracks and guard tracks may have the same width. In an example embodiment of a disc with multiple bands per zone, each zone may contain 110 tracks, and the 110 tracks may be divided into 10 bands containing 10 data tracks and 1 guard track each.

Guard tracks may be overlapped by both adjacent tracks without loss of data, as data may not be recorded to guard tracks. Accordingly, while all tracks may share the same width or write track center when defined on the disc, a band may include multiple track widths or read track centers in practice. As used herein, the path followed by a write element of a transducer head may be referred to as a "write track," and the path followed by a read element may be referred to as a "read track." As shown in FIG. 4, trimmed tracks 404 may have one width due to being partially overlapped in one direction; the last data tracks in each band 406, or "fat tracks," may have a second track width due to not being overlapped in either direction; and the guard tracks 410 may have a third track width due to being overlapped in both directions. The read center may be designated as the same for both shingled tracks 404 and "fat tracks" 406 for simplicity, or in some embodiments the read center for fat tracks 406 can be designated as the same as the write center.

Figure 5A:
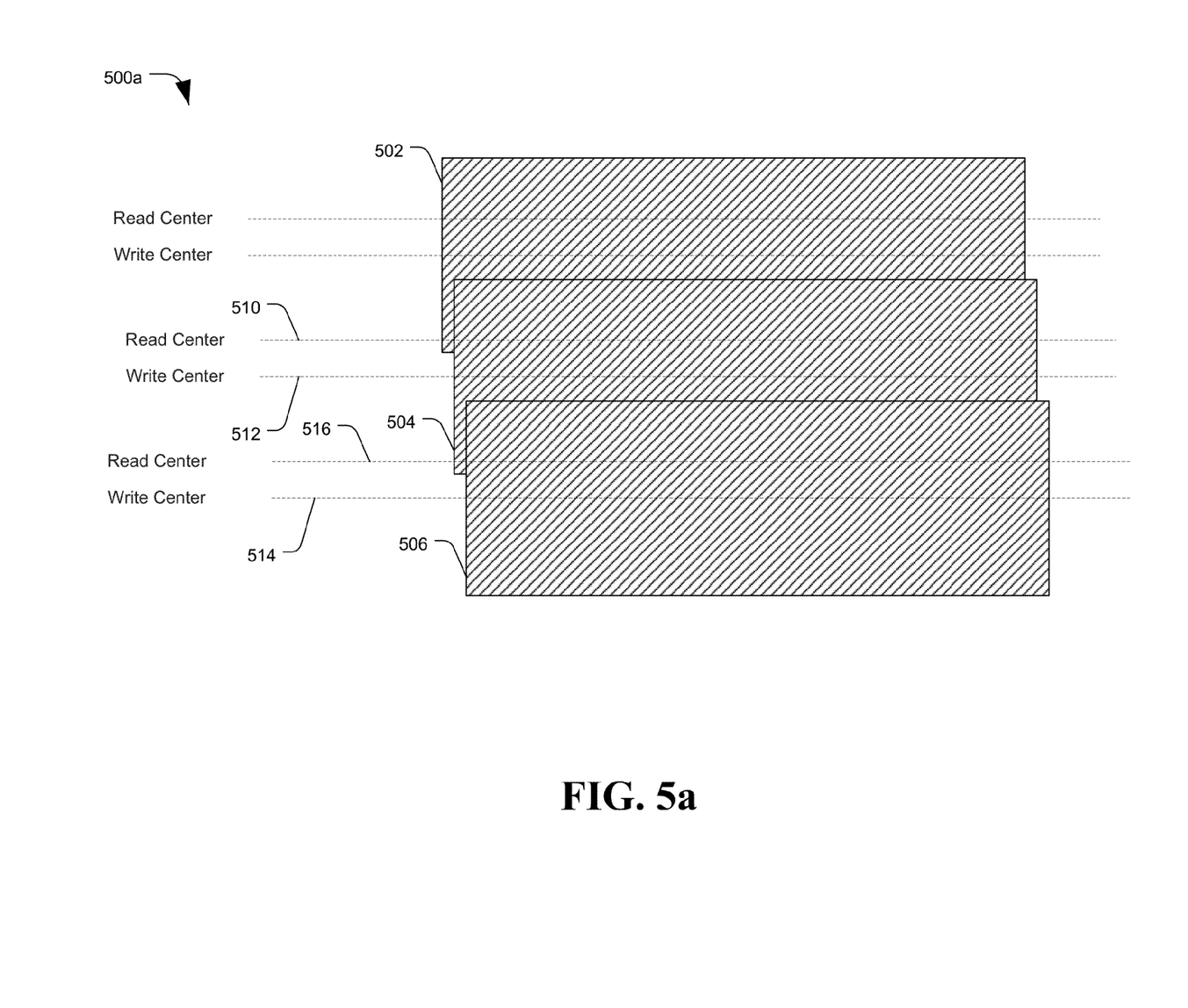
FIGS. 5a to 5c are diagrams of another illustrative embodiment of a system for track offset compensation in shingled recording.

Turning now to FIG. 5a, an illustrative embodiment of a system for track offset compensation in shingled recording is depicted and generally designated 500a. System 500a shows a number of shingled tracks from a single band. The band may include shingled data tracks 502, 504, and 506.

As discussed above, shingled media can have one data track partially overwrite an adjacent data track. For example, one data track 504 may overwrite ten percent, fifteen percent, twenty percent, or some other amount of an adjacent track 502. When writing to shingled tracks, the write head may be positioned over the center of a track 512, regardless of the shingled characteristic. When reading from shingled tracks, however, it may be desirable to center the read head over the non-overlapped portion of a track, at 510, rather than over the center of a track 512. This may reduce the likelihood of reading bad data by picking up data recorded on the adjacent overwriting track. In some embodiments, the last data track in a band 506, which should not be partially overlapped by any other track, can be treated as a non-shingled data track with a single read and write center 514, or it can be similarly read from an offset read center 516.

Figure 5B:
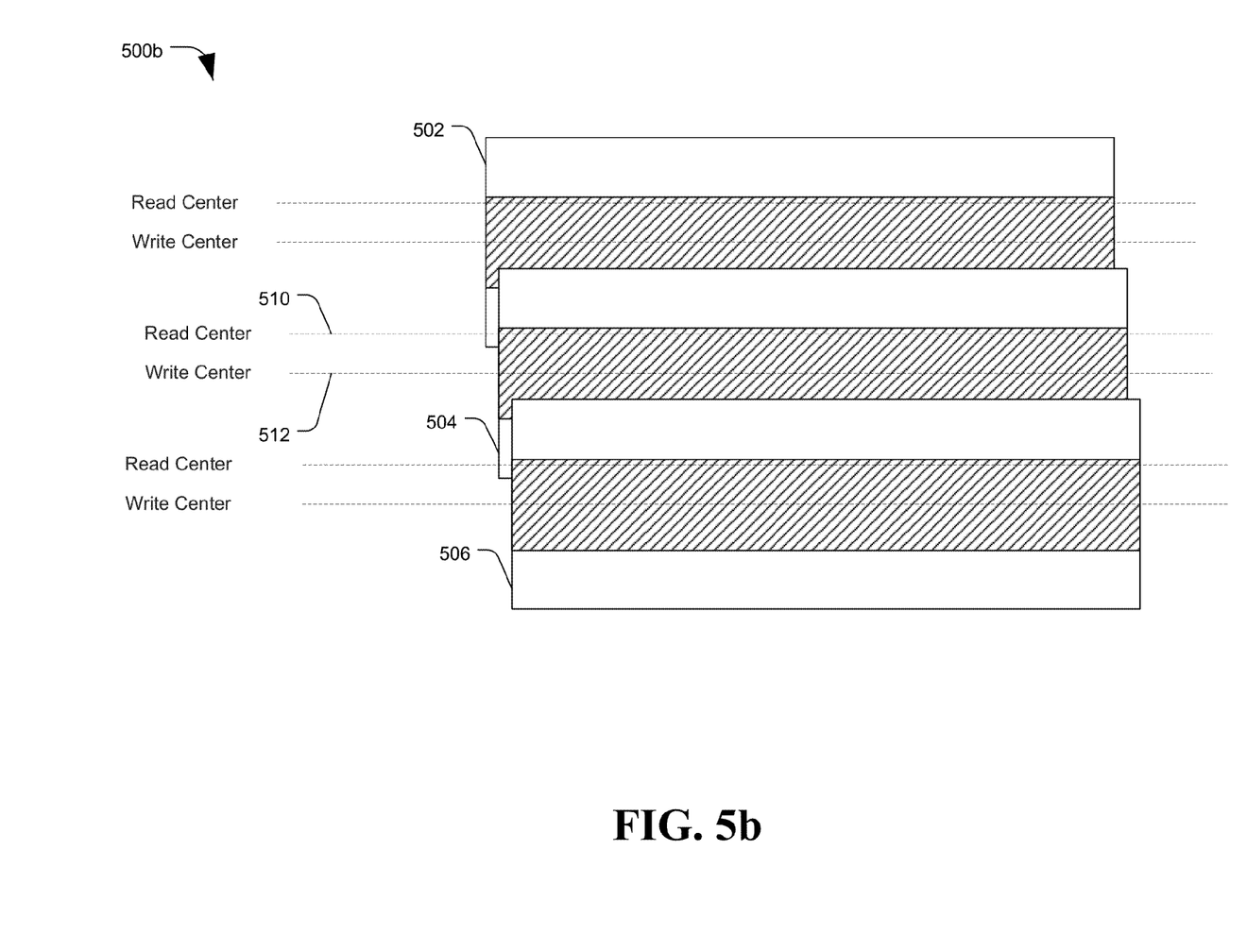

Turning now to FIG. 5b, an illustrative embodiment of a system for track offset compensation in shingled recording is depicted and generally designated 500b. As read or write heads become degraded, they may experience adverse changes to magnetic performance. For example, a degraded write head may produce a weaker magnetic field for writing and may consequently create a narrower readable magnetic strip of data. In convention magnetic recording devices this may not greatly impact drive performance, as the read center and write center of data tracks are approximately the same. Therefore the read head can still accurately read data from the center of the written track.

However, in shingled magnetic recording the write centers and read centers may not be the same. Example system 500b corresponds to the same three tracks from a shingled band as shown in FIG. 5a, with tracks 502, 504, and 506. However, in system 500b the write head may have become degraded. Data written to the write center 512 of the tracks may be difficult to read towards the farther boundaries of the track. Consequently, the shingled read center 510 used by a drive with new heads may produce read errors in a drive with degraded heads. Increased read errors and read retries can reduce a drive's performance.

Accordingly, it may be beneficial to adjust the read center for shingled tracks based on head wear. In some embodiments, track center may be shifted by parameters and influences besides head wear. For example, parameters such as high temperature or other stress conditions on a drive may cause a track center to shift temporarily or permanently, and the compensation scheme described in the present disclosure may be used to measure the parameters or their effects, and compensate for the track offset. In some embodiments, this may be employed in non-shingled magnetic recording (SMR) systems, where one or both of the read or write head elements experience stress that may affect a read or write center.

Figure 5C:
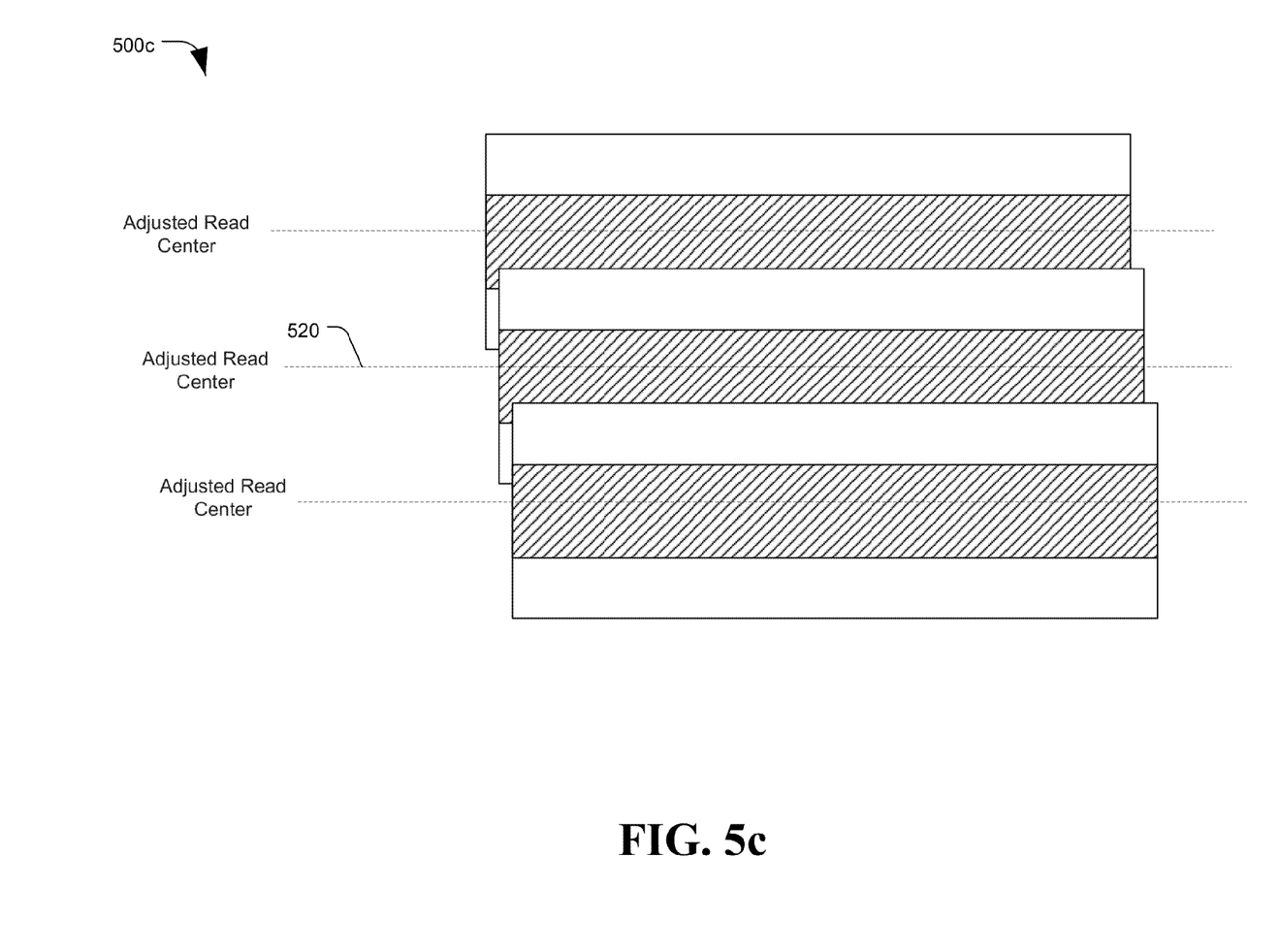

FIG. 5c depicts an illustrative embodiment of a system for track offset compensation in shingled recording, generally designated 500c. Similar to FIG. 5b, FIG. 5c depicts a series of shingled tracks recorded by degraded heads. However, rather than using the original read centers, the data storage device may read from adjusted read centers 520 based on a level of head degradation. For example, the data storage device may determine the approximate width of reliably readable data from a write head, and approximately center the adjusted read center 520 over the non-shingled portion of the reliably written data.

Off Track Capability (OTC) can be used to detect performance degradation of a write or a read head. Off-track capability generally refers to the ability of a head of a disk drive to accurately read data from a selected track or write data to a selected track. The OTC may be defined as the write-to-read track misregistration allowed at a specified error rate limit. This may be closely related to a portion of read track width which can be allowed to be out of the written data track without exceeding an error limit. As the read or write heads degrade or are otherwise stressed, the OTC margin may decrease. Discussion of head degradation herein may reference one type of head or another, but it should be understood that degradation or stress on either head can affect the OTC.

A drive can measure OTC for different regions of the data storage medium. For example, in some embodiments a drive may be configured to measure the OTC margin in predefined areas of a data storage medium during an idle period when the drive is not processing host or user operations. In some embodiments, the predefined areas for OTC measurement may be based on areas of the data storage medium written or read by a given head, so that the measurement results are based on the degradation of the corresponding head.

A "track offset compensation value" can be calculated based on the amount the OTC margin has changed compared to an OTC value measured earlier, such as during the factory manufacturing process. For example, the current OTC margin for an area may be compared against a stored previous OTC margin for that area. If the OTC margin has decreased (e.g. more read errors occur when following a read track center line), it can mean that head degradation or other stresses have occurred and a read track center line should be adjusted. The read track center line may be adjusted according to the track offset compensation value, calculated based on the amount of OTC margin change.

Figure 6:
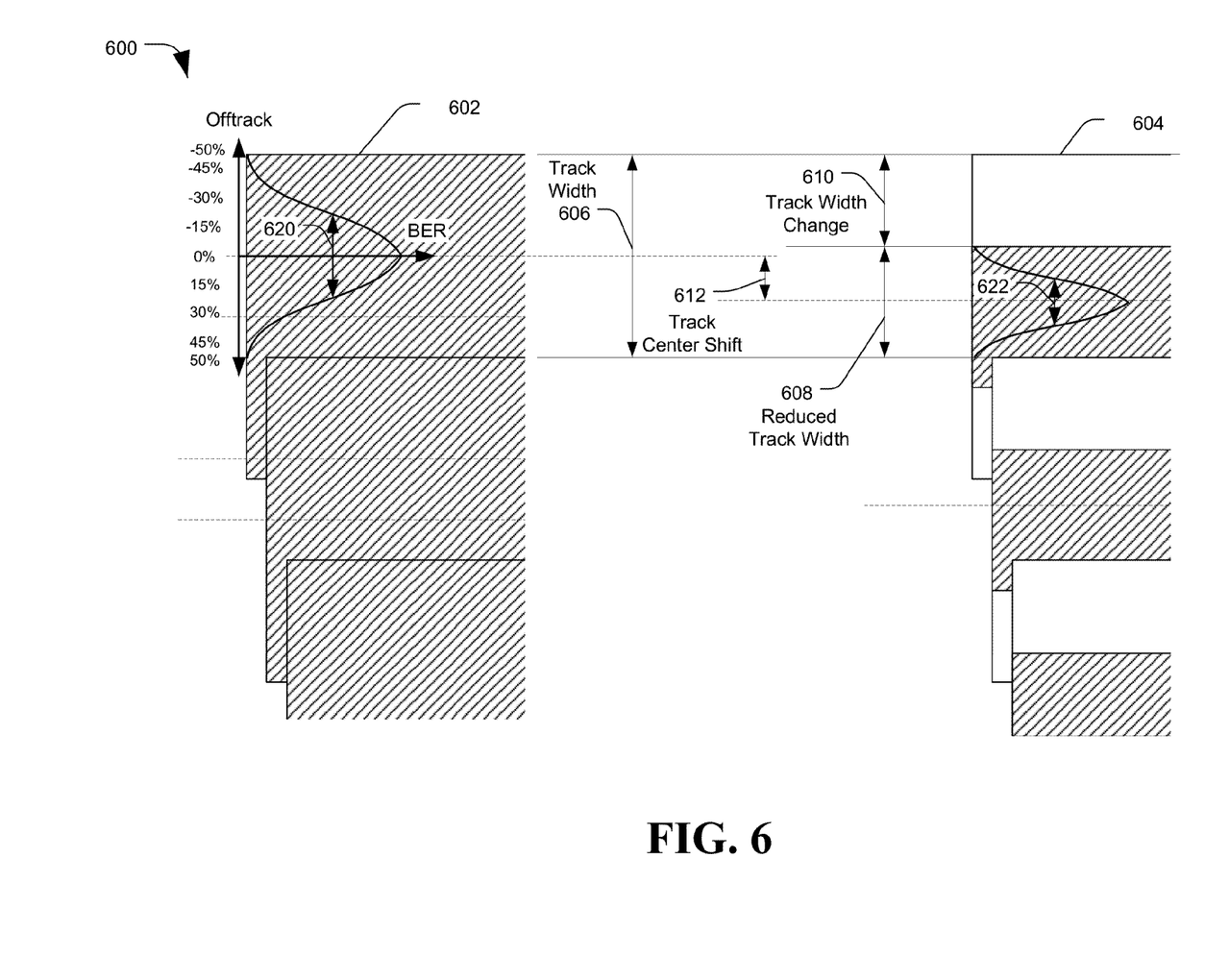
FIG. 6 is a diagram of another illustrative embodiment of a system for track offset compensation in shingled recording.

Turning now to FIG. 6, an illustrative embodiment of a system for track offset compensation in shingled recording is depicted and generally designated 600. FIG. 6 provides an example to demonstrate embodiments of track adjustment. An example section of shingled tracks with no head degradation or centerline-adjusting stress is depicted at 602. The read track width corresponding to the unshingled portion of the track may be seen at 606.

A section of shingled tracks with a reduced write track width, such as may occur with degraded write heads, is depicted at 604. The reduced readable track width of unshingled data may be seen at 608. The change in read track width between 602 and 604 may be seen at 610. Similarly, the shift in track center between 602 and 604 may be seen at 612. In some embodiments, such as the embodiment of FIG. 6, the amount of track center shift 612 may be very close to half of the track width change 610.

In some examples, the off track capability (OTC) margin for a track may be approximately half of the track width, or a bit less. In the example 600, the OTC margin 620 shows an acceptable bit error rate (BER) in relation to the off track percentage of the read head for tracks 602 without a degraded write track. This may be approximately an OTC margin of 44%, from −22% to 22%, thereby making it a little less than half of the whole track width (−50% to 50%). Meanwhile, OTC margin 622 for the degraded write track 604 may be approximately 20%, from 15% to 35%.

A track offset compensation value may be approximately $\alpha*$(OTC margin change), where $\alpha$ may be a coefficient value which may be adjusted system-to-system based on specific characteristics of the drive system. In some embodiments, a may be approximately set to "1." So in the example embodiment of FIG. 6, assuming a value of a of 0.98, the offset compensation value may be 0.98*(44−20)=23.52%. Adjustment of the $\alpha$ value and other adjustments may be performed based on the specifics of the system, anticipated wear characteristics, recording methods, or other factors.

Figure 7:
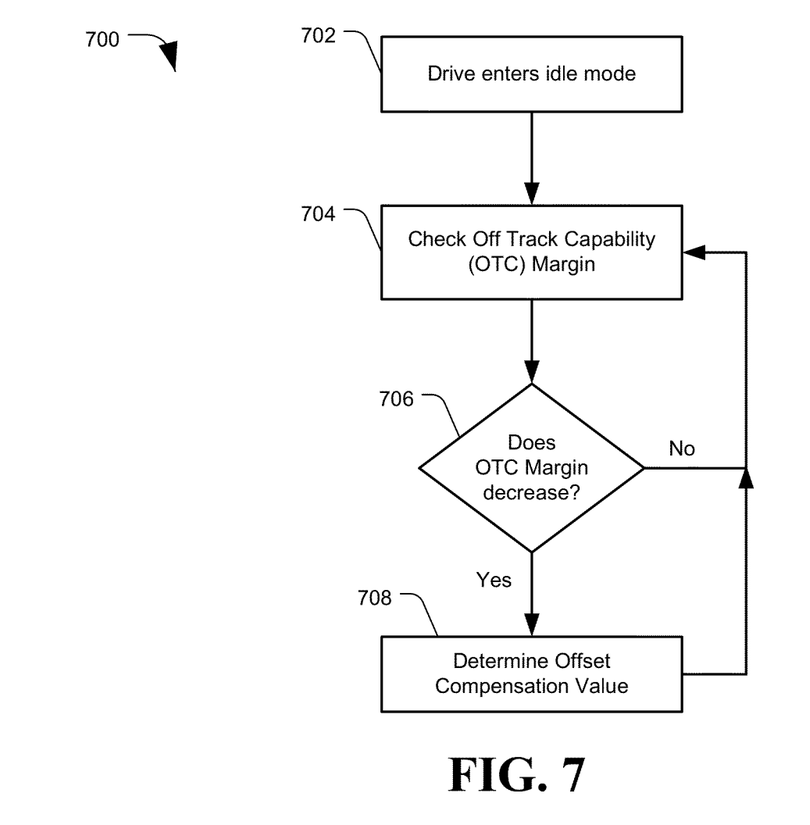
FIG. 7 is a flowchart of an illustrative embodiment of a method for track offset compensation in shingled recording.

Turning now to FIG. 7, an illustrative method for track offset compensation in shingled recording is depicted and generally designated 700. In an example, a disc drive may enter an idle mode at 702, such as when the drive is not processing any host or user-based operations, or has not received any commands for a period of time. The drive may then proceed to check the OTC margin for one or more designated areas of a data storage medium, at 704. Scan areas may be based on which write head is used to record data to an area, as wear may be based on the write head. In an example, OTC margin scanning may start at a first zone and proceed through each zone in order until the OTC margin for all zones have been scanned. This may involve interrupting the scans to perform other operations, and resuming the next time the drive enters an idle state. In other example embodiments, the drive may determine designated areas to test based on a number of read errors encountered in the designated areas. In some embodiments, rather than or in addition to waiting for an idle period, the drive may also test the OTC margins at scheduled times, based on a command from a host device, in response to encountering a threshold number of read errors, after a set number of read or write operations, or based on other criteria.

In an example embodiment, one or more locations can be identified from the OD to the ID for OTC margin testing. For example, during the factory process, areas of the discs may be identified as testing spots, such as locations with no defects, good position error signals (PES) and with uniform tracks (no TNU—track non-uniform). The selected locations may be identified as OTC margin check points. In some embodiments, these points may not be used to store user data, so that they can be rewritten and checked as desired.

After checking the OTC margin at 704, the method may involve determining whether the OTC margin has decreased for the tested area, at 706. For example, this may involve comparing the measured OTC margin against a baseline OTC margin, such as the margin measured during factory processing. If the OTC margin has not decreased, at 706, the method may return to testing the OTC margin according to specified triggers, at 704. If the OTC margin did decrease, at 706, the method may involve determining a track offset compensation value for the tested area, at 708. This may indicate degradation or stress influencing data writes. Determining a track offset compensation value may involve designating an amount to adjust the read center for tracks in the tested area to compensate for the decreased OTC margin. The track offset compensation value may be stored in a volatile or nonvolatile memory based on an area or write head. By adjusting a read track center by a track offset compensation value, the read reliability for tracks written by a degraded or stressed write head can be improved.

Figure 8:
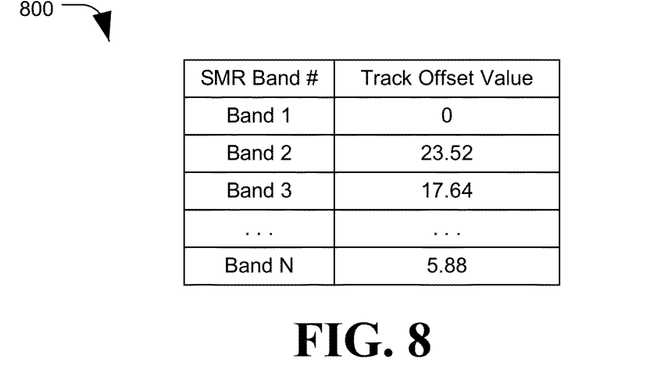
FIG. 8 is a diagram of another illustrative embodiment of a system for track offset compensation in shingled recording.

Turning now to FIG. 8, an illustrative embodiment of a system for track offset compensation in shingled recording is depicted and generally designated 800. A data storage device may maintain a track offset compensation table to store track offset compensation values for each area of a data storage medium, such as for each band or zone of a disc. For example, a data storage device may store the track offset compensation table to a non-volatile memory. An example embodiment of the table 800 is shown in FIG. 8. In the example embodiment, the table may include each SMR band number and its "track offset compensation value". When user data is written to a certain band, the "track offset compensation value" of that band may also be updated. In some embodiments, this may be a separate operation than determining the track offset compensation value as discussed in method 700.

For example, a single write head may be used to record data to a number of different recording bands. Over time, the head may become degraded or stressed, and the write track may be affected. This can be compensated by using the track offset compensation value. OTC margin testing for an area may involve writing data to a test area and reading it to determine the current condition of a write head and write tracks recorded thereby. However, if Band A is written before the write head becomes degraded, then no track offset compensation value should be applied when the band is read. If Band B is written after the degradation, however, a track offset compensation value may be beneficial for reading. Accordingly, it may be beneficial to determine a current OTC margin for an area, as described in regards to FIG. 7, but only update the track offset compensation table when data is actually written to a band, to ensure an accurate track offset compensation value is stored in relation to the amount of degradation when the data actually recorded in a given band.

In some embodiments, the table may be initialized to '0' for each band when it is created. When data is written to a band or area, the track offset compensation value may then be updated based on the OTC margin testing as disclosed in regards to FIG. 7. In other embodiments, the table may initially be empty, and entries may be added and subsequently updated for each band as a decreased OTC margin is detected and a track offset compensation value is calculated for the band. During read operations, the drive may then consult the table to determine how much to adjust the read center for tracks in each area, such as for each band. The values may be a percentage offset value for a track, which may be used to adjust the read head position.

In some embodiments, the values stored in the track offset compensation table may be a combination of the track offset compensation value, the shingling read center-write center offset, a geometry microjog value for the distance between the read head and the write head, or some other combination. This may reduce a number of calculations that need to be performed during read operations.

Figure 9:
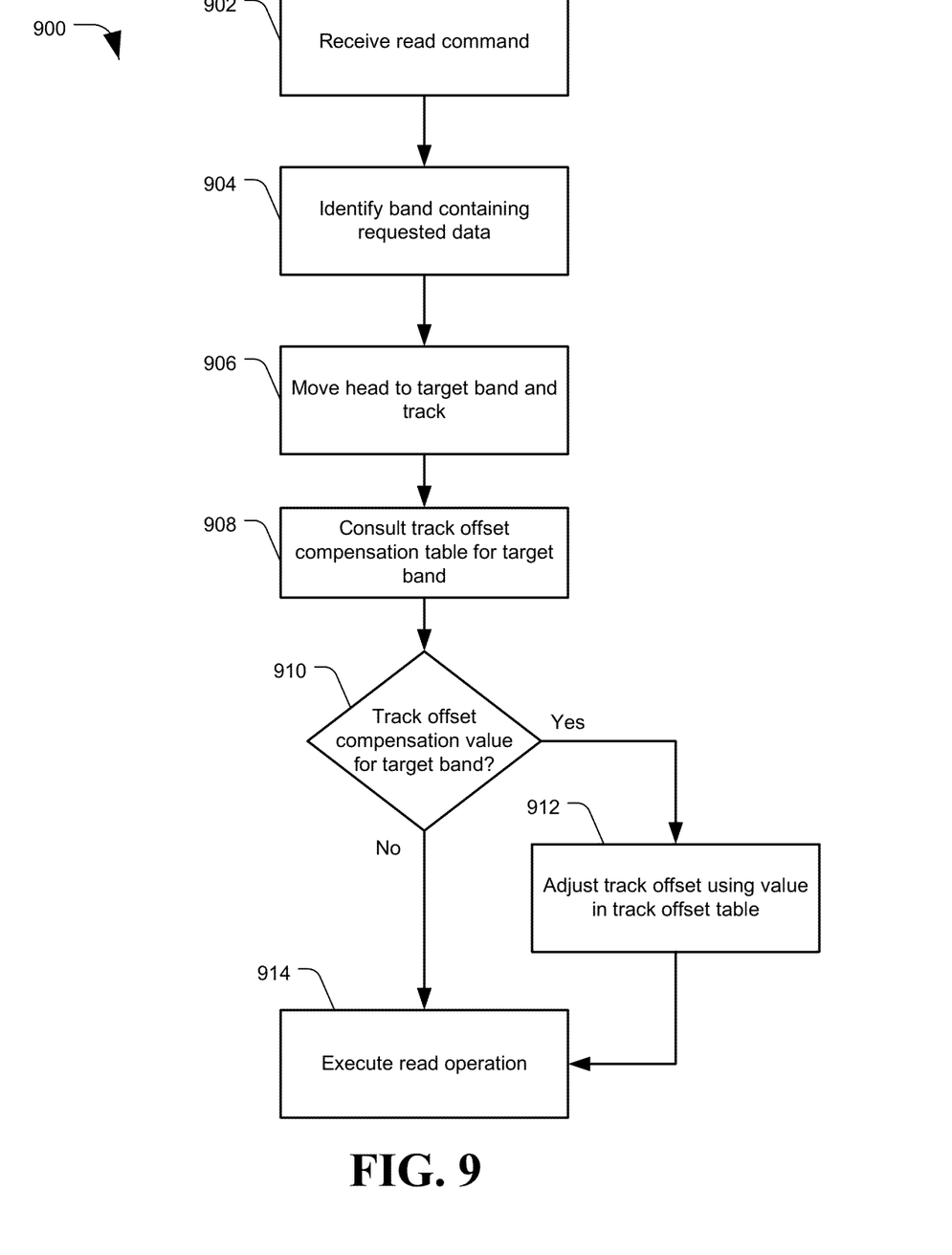
FIG. 9 is a flowchart of yet another illustrative embodiment of a method for track offset compensation in shingled recording.

Turning now to FIG. 9, an illustrative method for track offset compensation in shingled recording is depicted and generally designated 900. A data storage device (DSD) may receive a read command, at 902. The DSD may then identify the shingled recording band containing the data requested in the read command, at 904. This may include determining if the data is contained in a cache memory, in which case the data may be retrieved without accessing a shingled data storage medium.

After identifying the target band containing the requested data, the DSD may then move the read head to the target band and track, at 906. The DSD may consult the track offset compensation table for the target band, at 908, and determine if a track offset compensation value should be applied to adjust the read head positioning over the target tracks, at 910.

If the track offset compensation table contains a track offset compensation value for the current band at 910, the DSD may adjust the read track offset using the track compensation value, at 912. After adjusting the track offset at 912, or if the target band does not have a track offset compensation value in the table at 910, the DSD may then execute the read operation, at 914.

In some embodiments, the table may store compensation values for other areas of the data storage medium, such as by zone. In some embodiments, the DSD may look up the compensation table before moving the head to the target band. Other variations are also possible without departing from the scope of the disclosure.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a processor configured to:
      receive a read command to retrieve data from a data storage medium having data stored in a shingled manner where at least one track is partially overlapped by an adjacent track;
      determine a track offset compensation value, including:
         determine a first off-track capability (OTC) margin for a first area of the data storage medium;
         calculate the track offset compensation value for the first area by comparing the first OTC margin against a second OTC margin for the first area measured at an earlier time;
      determine an adjusted position of a read element based on the track offset compensation value, the adjusted position including a shift of a read track center to produce a shifted read track center based on the track offset compensation value; and
      during a read operation corresponding to the read command, retrieve the data from the at least one track based on the read element following the shifted read track center.

2. The apparatus of claim 1 comprising the processor further configured to:
   determine the first OTC margin for the first area when a data storage device including the processor is in an idle state.

3. The apparatus of claim 1 comprising the processor further configured to store the track offset compensation value for the first area in a table of track offset compensation values.

4. The apparatus of claim 3 further comprising:
   the data storage medium includes a plurality of bands, each band containing a plurality of shingled data tracks;
   the first area includes a selected band of the plurality of bands; and
   track offset compensation values for each band of the data storage medium are stored in the table.

5. The apparatus of claim 1 further comprising:
   a data storage device including:
      the processor;
      the data storage medium; and
      an interface configured to receive the read command from a host device.

6. The apparatus of claim 1 further comprising:
   the track offset compensation value is determined based on a measured parameter including an amount of degradation of a transducer for the first area.

7. The apparatus of claim 6 further comprising:
   the transducer includes the read element.

8. The apparatus of claim 1 further comprising:
   the track offset compensation value is determined based on a measured parameter including a temperature of the apparatus.

9. A method comprising:
   determining a track offset compensation value for a first area of a data storage medium based on a measured parameter, including:
      measuring a first off track capability (OTC) margin for the first area of the data storage medium;
      comparing the first OTC margin to a second OTC margin for the first area measured at an earlier time;
      calculating the track offset compensation value based on results of the comparison;
   determining a shift of a read track center based on the track offset compensation value;
   during a read operation, adjusting a position of a read head based on the shift to produce a shifted position; and
   reading data, via the read head, from the first area based on the shifted position.

10. The method of claim 9 further comprising:
    adjusting the position of the read head includes shifting a first read track center to a second read track center according to the track offset compensation value.

11. The method of claim 9 further comprising:
    the first area includes a band of shingled data tracks.

12. The method of claim 11 further comprising:
    receiving a read command at a data storage device including the data storage medium;
    identifying the band containing data specified in the read command; and
    determining the track offset compensation value for the band includes retrieving the track offset compensation value from a table including track offset compensation values for a plurality of bands.

13. The method of claim 9, the method further comprising:
    determining the measured parameter, the measured parameter including an amount of performance degradation of a transducer for the first area.

14. A data memory device containing computer-readable instructions that, when executed by a processor, perform a method comprising:

receiving a read command at a data storage device including a data storage medium;

determining a track offset compensation value for a first area of the data storage medium based on a measured parameter for the first area, including:

measuring a first off track capability (OTC) margin for the first area;

comparing the first OTC margin to a second OTC margin for the first area measured at an earlier time;

calculating the track offset compensation value based on results of the comparison;

shifting, according to the track offset compensation value, a read track center for a data track of the first area to produce a shifted read track center; and during a read operation, applying the shifted read track center to modify a location of a read head when reading data from the data track.

15. The data memory device of claim 14, wherein the data storage medium includes a plurality of bands, each band containing a plurality of shingled data tracks and the first area includes a band from the plurality of bands, and the method further includes:

storing track offset compensation values for each band of the plurality of bands to a table of track offset compensation values;

identifying a target band containing data specified in the read command, the target band corresponding to the first area; and determining the track offset compensation value for the target band includes retrieving the track offset compensation value from the table.

16. The data memory device of claim 14, the method further comprising:

determining the measured parameter, the measured parameter including an amount of performance degradation of a transducer.

* * * * *